US012743475B2

(12) United States Patent
Liang et al.

(10) Patent No.: US 12,743,475 B2
(45) Date of Patent: Sep. 22, 2026

(54) METHOD, APPARATUS, DEVICE AND STORAGE MEDIUM FOR PROVIDING CONTENT IN APPLICATION

(71) Applicants: Beijing Youzhuju Network Technology Co., Ltd., Beijing (CN); Lemon Inc., Grand Cayman (KY)

(72) Inventors: Jiawang Liang, Beijing (CN); Wang Huang, Beijing (CN); Ning Lu, Singapore (SG); Zhe Wang, Los Angeles, CA (US); Haiqian He, Singapore (SG)

(73) Assignees: BEIJING YOUZHUJU NETWORK TEECHNOLOGY CO., LTD., Beijing (CN); LEMON INC., Grand Cayman (KY)

( * ) Notice: Subject to any disclaimer, the term of this patent is extended or adjusted under 35 U.S.C. 154(b) by 0 days.

(21) Appl. No.: 18/880,509

(22) PCT Filed: Nov. 14, 2023

(86) PCT No.: PCT/CN2023/131648
§ 371 (c)(1),
(2) Date: Dec. 31, 2024

(87) PCT Pub. No.: WO2024/104358
PCT Pub. Date: May 23, 2024

(65) Prior Publication Data

US 2025/0390540 A1 Dec. 25, 2025

(30) Foreign Application Priority Data

Nov. 15, 2022 (CN) ......................... 202211427507.6

(51) Int. Cl.
*G06F 16/95* (2019.01)
*G06F 9/50* (2006.01)
(Continued)

(52) U.S. Cl.
CPC ........ *G06F 16/9535* (2019.01); *G06F 9/5005* (2013.01); *G06F 16/954* (2019.01)

(58) Field of Classification Search
CPC ... G06F 16/9535; G06F 9/5005; G06F 16/954
See application file for complete search history.

(56) References Cited

U.S. PATENT DOCUMENTS 7,813,822 B1 * 10/2010 Hoffberg ................ H04N 7/163 381/73.1
9,392,047 B1 * 7/2016 Santana ................. H04L 67/34
(Continued)

FOREIGN PATENT DOCUMENTS

CN 103218366 A 7/2013
CN 104994147 A 10/2015
(Continued)

OTHER PUBLICATIONS

International Search Report for PCT/CN2023/131648, mailed on Jan. 26, 2024, 5 pages.

*Primary Examiner* — Merilyn P Nguyen
(74) *Attorney, Agent, or Firm* — Astute IP Law Group

(57) ABSTRACT

According to embodiments of the present disclosure, a method, an apparatus, a device, and a storage medium for providing content in an application are provided. In a method, a first-type interaction event between a user of an application and content provided in the application is received. Based on the first-type interaction event and an event model, a prediction of whether the user performs a second-type interaction event associated with the content is determined, the event model describing an association relationship between the first-type interaction event performed by the user and the second-type interaction event performed by the user. A provision action of providing the content in the application is adjusted based on the prediction. In this way, the prediction of the second-type interaction event may be
(Continued)

determined in a more real-time and accurate manner, and the provision action may be adjusted based on the prediction.

20 Claims, 5 Drawing Sheets

(51) Int. Cl.
*G06F 16/9535* (2019.01)
*G06F 16/954* (2019.01)

(56) References Cited

U.S. PATENT DOCUMENTS

| | | | | |
|---|---|---|---|---|
| 11,238,522 | B1 * | 2/2022 | Subramanian | G06Q 30/0639 |
| 2010/0287228 | A1 | 11/2010 | Hauser | |
| 2015/0278837 | A1 * | 10/2015 | Lahav | G06Q 30/0204<br>705/7.33 |
| 2019/0370687 | A1 * | 12/2019 | Pezzillo | H04L 67/10 |
| 2021/0287108 | A1 * | 9/2021 | Hwang | G06F 11/3616 |
| 2023/0017196 | A1 * | 1/2023 | Jain | H04L 67/01 |
| 2023/0025718 | A1 * | 1/2023 | Varnavas | G06F 11/302 |

FOREIGN PATENT DOCUMENTS

| | | | |
|---|---|---|---|
| CN | 107787503 | A | 3/2018 |
| CN | 111095330 | A | 5/2020 |
| CN | 114461919 | A | 5/2022 |
| CN | 115328309 | A | 11/2022 |

* cited by examiner

METHOD, APPARATUS, DEVICE AND STORAGE MEDIUM FOR PROVIDING CONTENT IN APPLICATION

CROSS REFERENCE TO RELATED APPLICATIONS

The present application is a national stage application based on International Application No. PCT/CN2023/131648, filed on Nov. 14, 2023, which claims priority to Chinese Patent Application No. 202211427507.6, filed on Nov. 15, 2022, and entitled "METHOD, APPARATUS, DEVICE AND STORAGE MEDIUM FOR PROVIDING CONTENT IN APPLICATION", the disclosures of which is are incorporated herein by reference in their entireties.

FIELD

Example embodiments of the present disclosure generally relate to the field of computer technologies, and in particular, to a method, an apparatus, a device, and a computer-readable storage medium for providing content in an application.

BACKGROUND

With the development of Internet technologies, various types of content may be accessed through the Internet, and such content may provide, for example, promotional information about various objects (for example, applications, games, audios, videos, etc.). A content provision platform may provide content about various objects in an application. In this case, an action for providing the content may be adjusted according to a conversion status of the content (for example, downloads, registrations, purchases, or other events associated with the respective objects in the content). However, for reasons such as security, events related to content conversion may not be determined in real time.

SUMMARY

In a first aspect of the present disclosure, a method for providing content in an application is provided. In the method, a first-type interaction event between a user of an application and content provided in the application is received. Based on the first-type interaction event and an event model, a prediction of whether the user performs a second-type interaction event associated with the content is determined, the event model describing an association relationship between the first-type interaction event performed by the user and the second-type interaction event performed by the user. A provision action of providing the content in the application is adjusted based on the prediction.

In a second aspect of the present disclosure, an apparatus for providing content in an application is provided. The apparatus includes: a receiving module configured to receive a first-type interaction event between a user of an application and content provided in the application; a determination module configured to determine, based on the first-type interaction event and an event model, a prediction of whether the user performs a second-type interaction event associated with the content, the event model describing an association relationship between the first-type interaction event performed by the user and the second-type interaction event performed by the user; and an adjustment module configured to adjust a provision action of providing the content in the application based on the prediction.

In a third aspect of the present disclosure, an electronic device is provided. The device includes at least one processing unit; and at least one memory coupled to the at least one processing unit and storing instructions executable by the at least one processing unit. The instructions, when executed by the at least one processing unit, cause the device to perform the method of the first aspect.

In a fourth aspect of the present disclosure, a computer-readable storage medium is provided. The medium has a computer program stored thereon, and the computer program, when executed by a processor, implements the method of the first aspect.

It should be understood that the content described in the Summary section is not intended to identify key features or important features of the embodiments of the present disclosure, nor is it intended to limit the scope of the present disclosure. Other features of the present disclosure will become readily apparent from the following description.

BRIEF DESCRIPTION OF THE DRAWINGS

The above and other features, advantages and aspects of various embodiments of the present disclosure become more apparent in combination with the drawings and with reference to the following detailed description. In the drawings, the same or similar reference numerals denote the same or similar elements, where.

DETAILED DESCRIPTION OF EMBODIMENTS

Figure 1:
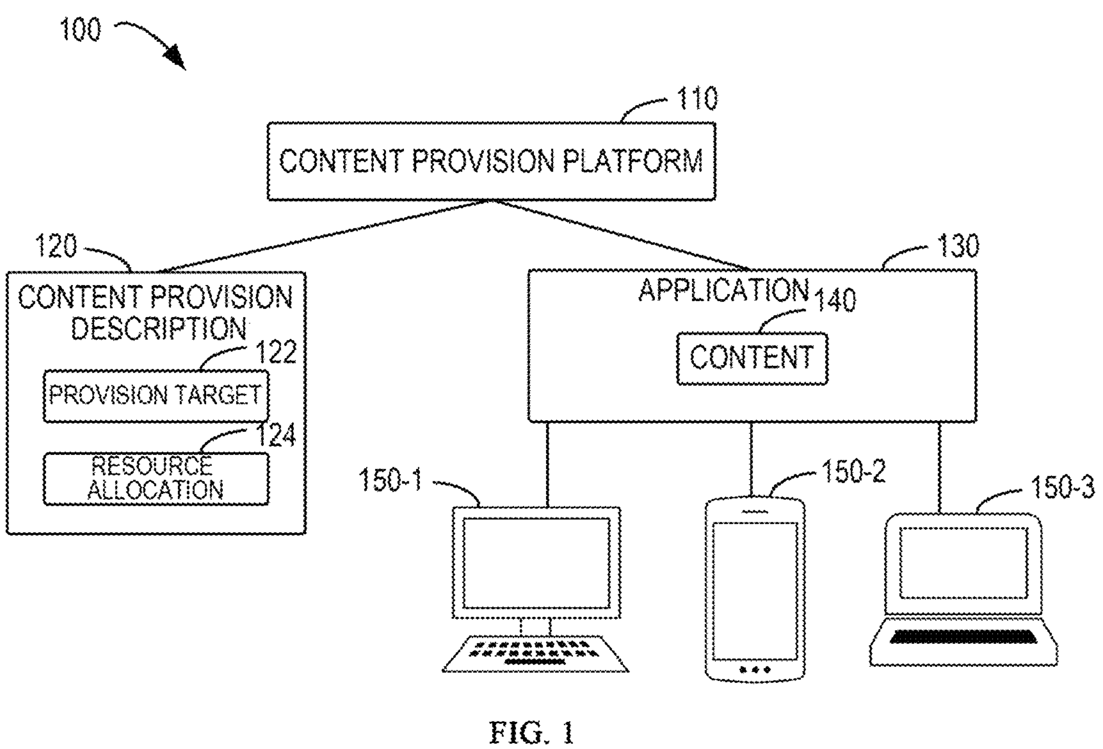
FIG. 1 shows a schematic diagram of an example environment in which embodiments of the present disclosure may be implemented.

Embodiments of the present disclosure will be described in more detail below with reference to the drawings. Although some embodiments of the present disclosure are shown in the drawings, it should be understood that the present disclosure may be implemented in various forms and should not be construed as limited to the embodiments set forth herein. On the contrary, these embodiments are provided for a more thorough and complete understanding of the present disclosure. It should be understood that the drawings and the embodiments of the present disclosure are only for illustrative purposes and are not intended to limit the scope of the present disclosure.

In the description of the embodiments of the present disclosure, the term “include/comprise” and similar terms should be understood as open inclusion, that is, “include/comprise but are not limited to”. The term “based on” should be understood as “at least partially based on”. The term “one embodiment” or “the embodiment” should be understood as “at least one embodiment”. The term “some embodiments” should be understood as “at least some embodiments”. Other explicit and implicit definitions may also be included below.

It should be understood that the data involved in the technical solutions of the present disclosure (including but not limited to the data itself, the acquisition or use of the data) should comply with the requirements of corresponding laws, regulations and related provisions.

It should be understood that before using the technical solutions disclosed in the embodiments of the present disclosure, the user should be informed of the type, scope of use, use scenarios, etc. of the personal information involved in the present disclosure and the user’s authorization should be obtained in an appropriate manner in accordance with relevant laws and regulations.

For example, in response to receiving an active request from the user, prompt information is sent to the user to clearly inform the user that the operation requested by the user will require the acquisition and use of the user’s personal information, so that the user may independently choose whether to provide the personal information to software or hardware such as an electronic device, an application, a server, or a storage medium that performs the operation of the technical solutions of the present disclosure according to the prompt information.

As an optional but non-limiting implementation, in response to receiving an active request from the user, the prompt information may be sent to the user in the form of a pop-up window, and the prompt information may be presented in text in the pop-up window. In addition, the pop-up window may further include a selection control for the user to select “agree” or “disagree” to provide the personal information to the electronic device.

It should be understood that the above process of notifying and obtaining the user’s authorization is only schematic and is not intended to limit the implementations of the present disclosure, and other methods that meet relevant laws and regulations may also be applied to the implementations of the present disclosure.

As used herein, the term “model” may learn an association relationship between corresponding input and output from training data, so that corresponding output may be generated for a given input after the training is completed. The generation of the model may be based on machine learning technology. Deep learning is a machine learning algorithm that uses a plurality of layers of processing units to process input and provide corresponding output. A neural network model is an example of a model based on deep learning. As used herein, the term “model” may also be referred to as a “machine learning model”, a “learning model”, a “machine learning network”, or a “learning network”, which are used interchangeably herein.

A “neural network” is a machine learning network based on deep learning. The neural network may process input and provide corresponding output, and usually includes an input layer and an output layer, and one or more hidden layers between the input layer and the output layer. The neural network used in deep learning applications usually includes many hidden layers, thereby increasing the depth of the network. The layers of the neural network are connected in sequence, so that the output of the previous layer is provided as the input of the next layer, where the input layer receives the input of the neural network, and the output of the output layer is the final output of the neural network. Each layer of the neural network includes one or more nodes (also known as processing nodes or neurons), and each node processes input from the previous layer.

Generally, machine learning may generally include three stages, namely, a training stage, a test stage, and an application stage (also known as an inference stage). In the training stage, a given model may be trained with a large amount of training data, and the parameter values are iteratively updated until the model may obtain consistent inferences that meet an expected target from the training data. Through training, the model may be considered to be able to learn the association between the input and the output (also known as input-to-output mapping) from the training data. The parameter values of the trained model are determined. In the test stage, the test input is applied to the trained model, and whether the model may provide correct output is tested, thereby determining the performance of the model. In the application stage, the model may be used to process the actual input based on the parameter values obtained from training, and to determine the corresponding output.

FIG. 1 shows a schematic diagram of an example environment 100 in which embodiments of the present disclosure may be implemented. As shown in FIG. 1, the content provision platform 110 may provide content 140 in one or more applications 130 based on a content provision description 120. For example, a content provider may define the specific content of the content provision description 120 to define in which application to deliver the content, what content to deliver, and how to deliver such content. The content provider may represent an entity that requests to deliver the content 140 in the application 130 via the content provision platform 110. In the scenario of advertisement delivery, the “content provider” is sometimes also referred to as an “advertiser”.

In the context of the present disclosure, more details about content provision will be described by using information for promoting a game (and/or other applications, audios, videos) as a specific example of the content 140. In this case, the content provision description 120 may specify provision of the content 140 for promoting a certain game in the application 130 (for example, a video application, a short video application, a social application, etc.).

Further, the content provision description 120 may include a provision target 122 and a resource allocation 124. Here, the provision target 122 may represent a target of interaction events (for example, downloads, subscriptions, payments, registrations, etc.) obtained by provision of the content 140 in the application 130. For example, the provision target 122 may specify a predetermined number of game downloads that the content 140 provided in the application 130 is expected to be achieved, and so on. The resource allocation 124 may represent resources allocated to enable the content 140 provided in the application 130 to meet the provision target 122. Here, resources may be represented in a quantitative manner. For example, computing resources, storage resources, network resources, etc. may be represented as resource units in a unified manner. Specifically, a numerical range of 0-100 may be used to represent the resource unit, and the content provider may pay a corresponding fee to use the resource units in the content provision platform 110.

When providing the content 140 in the application 130, resources of the content provision platform 110 need to be occupied, and in this case, the content provision platform 110 will deduct the corresponding resource unit. For example, the content provision platform 110 may specify that when the content 140 is provided to a user of the application 130, a resource unit will be deducted from the account of the content publisher. Alternatively, and/or additionally, the mapping relationship between the content and the resource unit may be defined based on other rules.

The user may interact with the application 130 via one or more terminal devices 150-1, 150-2, 150-3, etc. (for ease of discussion, collectively or individually referred to as the terminal device 150), and the terminal device 150 may be installed with the application to access the content 140. The content provider may provide different content 140 to different terminal devices 150 based on the content provision description 120 and user operations at the terminal devices 150.

It should be understood that the structure and function of the respective elements in the environment 100 are described for illustrative purposes only, without implying any limitation to the scope of the present disclosure. In the scenario of content provision, it is usually necessary to measure various indicators related to the content provision description 120. For example, it may be determined in real time and/or periodically whether the interaction events of the respective users meet the provision target 122, so as to determine whether the current content provision action meets the target of the content publisher. Generally speaking, during the provision of content, it is expected that the return of the provision action may be measured in real time to meet the expected target, so as to guide the subsequent provision action to meet the target of the content publisher.

The conversion of the content provision action usually occurs outside the application 130. For example, the download behavior of a multimedia file may occur in a source website of the multimedia file. The download behavior of some applications may occur in a third-party application download platform (e.g., an application store of a terminal device or an application download website). The registration behavior of an application may occur in an application platform, etc. In this case, a platform managed by the content publisher or a third-party platform needs to feedback the conversion data (for example, various conversion events, and/or benefits brought by the conversion) of the content provision action to the content provider.

Figure 2:
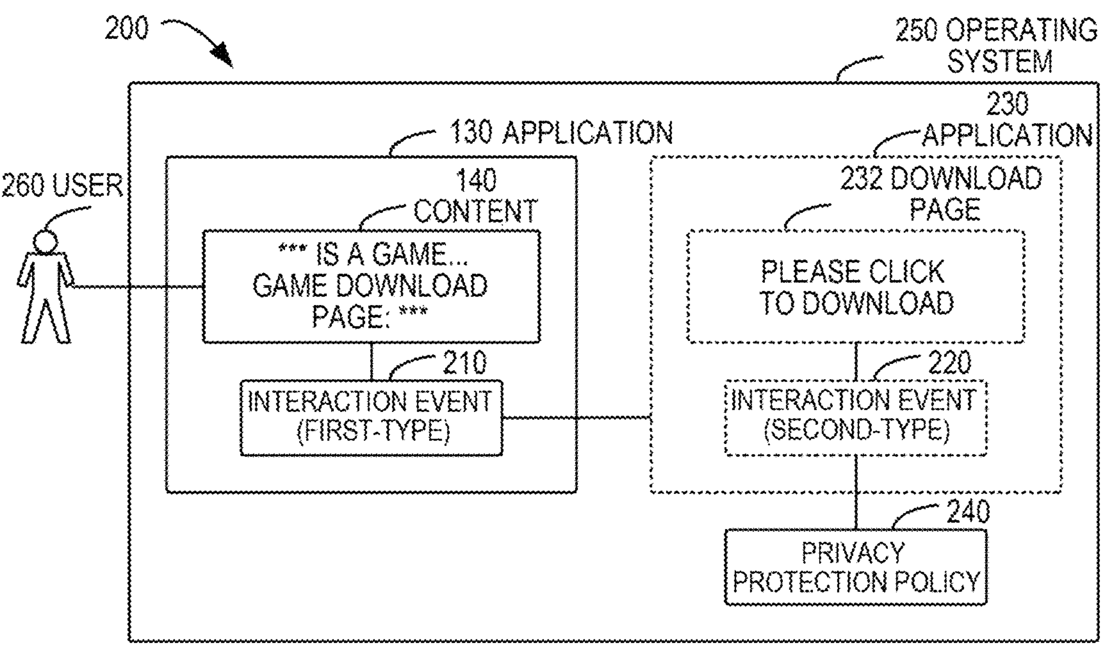
FIG. 2 shows a block diagram of interactions between a user and an application according to some embodiments of the present disclosure.

FIG. 2 shows a block diagram 200 of interactions between a user and an application according to some embodiments of the present disclosure. As shown in FIG. 2, the application 130 may run on an operating system 250, and at this time, the user 260 may access the content 140 in the application 130. Various interaction events 210 (for example, first-type interaction events) of the user for the content 140 may be detected. For example, the user may browse text, images, videos, etc. in the content 140, and may interact with various controls in the content 140. For example, the user 260 may open an application 230 (for example, open a website of a game provider in a browser or other applications, etc.) for downloading the game by clicking on a link "game download page: *". In this case, the user 260 may download the game in the download page 232. For the convenience of description, the download event may be referred to as a second-type interaction event 220 associated with the content 140**.

In some scenarios, due to the privacy protection policy 240 or due to the characteristics of content conversion, the conversion return may be delayed. For example, certain conversion behaviors (for example, payment behaviors) occur only after a period of time since the content provision action is delivered. For another example, in order to avoid tracking individual user behaviors, the privacy protection policy 240 does not support real-time feedback of conversions. Such a delayed conversion return makes the cost of the content provision action inaccurate.

For example, on the third day after the content provision action is performed, the content provider may obtain a part of the feedback. The content provider may usually obtain the real-time cost of the content provision action. Based on the partial benefits available on the third day and the real-time cost, the determined return rate metric will be lower than the actual cost, because the benefits brought by the content provision action may still occur after the third day, or may only be informed to the content provider until after the third day. The evaluation error of the return rate may bring many adverse effects, including the real-time effect evaluation of the content provision action, the subsequent execution of the content provision action, and so on.

Figure 3:
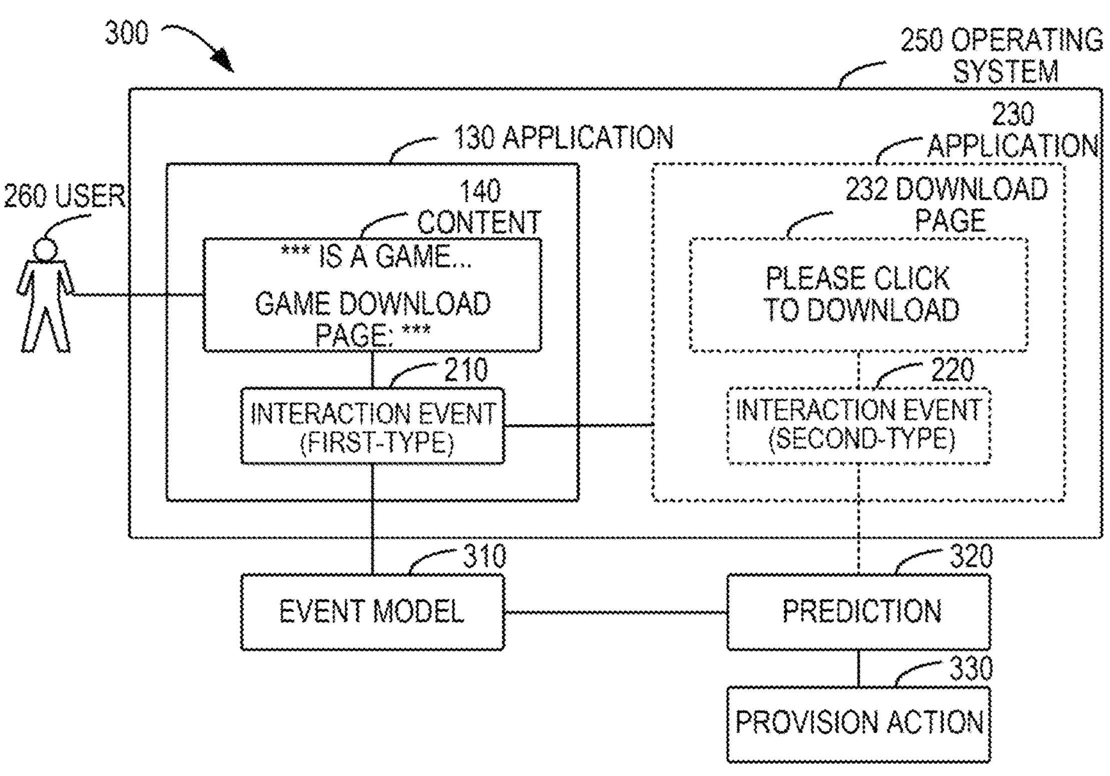
FIG. 3 shows a block diagram of a process of providing content in an application based on a prediction of a second-type interaction event according to some embodiments of the present disclosure.

In order to solve the above defects at least partially, a method for providing content in an application is provided. An overview according to an example implementation of the present disclosure is described with reference to FIG. 3, which illustrates a block diagram 300 of a process of providing content in an application based on a prediction of an interaction event according to some embodiments of the present disclosure. As shown in FIG. 3, a first-type interaction event 210 between a user 260 of an application 130 and content 140 provided in the application 130 may be received. Further, a prediction 320 of whether the user 260 performs a second-type interaction event 220 associated with the content 140 may be determined based on the first-type interaction event 210 and an event model 310.

It will be appreciated that the event model 310 here may be implemented based on machine learning technology, and may describe an association relationship between the first-type interaction event performed by the user and the second-type interaction event performed by the user. Specifically, the event model 310 may be trained with historical interaction events collected in the past. Further, the provision action 330 of providing the content 140 in the application 130 may be adjusted based on the prediction 320. According to an example implementation of the present disclosure, the content provision solution may be performed in the content provision platform 110. Here, the content provision platform 110 may be located in the application 130, or may be independent of the application 130 and may communicate with the application 130.

With the example implementation of the present disclosure, the event model 310 obtained based on historical data may describe the association relationship between two types of interaction events performed by the user. With the event model 310, it may be predicted whether the user 260 who has performed the first-type interaction event 210 performs the second-type interaction event 220.

According to an example implementation of the present disclosure, the first-type interaction event 210 may include a plurality of aspects. For example, the first-type interaction event 210 may include browsing of the user for the content.

Specifically, it may be detected that the user 260 opens the page of the content 140, and the time that the user stays on the page may be acquired. For another example, the user 260 may interact with a content item in the content 140. Specifically, it may be detected that the user 260 performs interaction actions such as clicking and sliding on respective text, images, videos, and controls in the content 140. For another example, navigation of the user 260 to a further application 230 outside the application 130 via the content item in the content 140. Specifically, the user 260 may click on "game download page" in the content 140, and be navigated to the page for downloading the game in the browser application to proceed with the download. Alternatively, and/or additionally, the game download page may be opened in the application 130 and the download may be performed.

According to an example implementation of the present disclosure, the user 260 may comment on the content 140 in the application 130. For example, the application 130 may support various users to comment on the published content 140, so as to express the users' views on the game. For another example, the user 260 may publish a creation associated with the content 140 in the application 130. Specifically, the user 260 may publish a new text, image, video, short video, or other creation to express his/her feelings about the game. For another example, the user 260 may follow the publisher of the content 140 to obtain more information about the content 140 and/or other content from the publisher in time.

According to an example implementation of the present disclosure, the user 260 may browse other content published by the publisher of the content 140. For another example, the user 260 may comment on other content published by the publisher of the content 140, and so on.

It will be appreciated that the above only describes examples of the first-type interaction event 210 in an example manner. Here, the first-type interaction event 210 may be conducive to predicting whether the user 260 will perform actions such as downloading subsequently. Generally speaking, the longer the user browses, the more interactions with the content item in the content 140, the more comments on the content 140, and the more creations published related to the content 140, the greater the probability of occurrence of the download action. In this way, by extracting multi-faceted features related to the first-type interaction event 210, it may be more conducive to describing the association relationship between the two interaction events.

According to an example implementation of the present disclosure, the second-type interaction event 22 has been described above by using downloading as an example. Alternatively, and/or additionally, the second-type interaction event 220 may further include other events representing returns generated for the provision 140, such as subscribing, paying, registering, and other events. In this way, the beneficial impact that may be generated by provision of the content may be evaluated in a richer way, which in turn facilitates the content provision platform 110 to adjust the provision action 330 in a more effective way. Therefore, the provision action 330 may provide the content 140 in the application 130 in a trend that is more aligned with the provision target 122 of the content publisher.

It will be appreciated that specific examples of the first-type interaction event 210 are only provided above in an example manner. Alternatively, and/or additionally, the first-type interaction event 210 may include more, fewer, or different types of examples. It will be appreciated that the above interaction events are all performed by the user 260 inside the application 130, and the application 130 may detect the above interaction events in a permissible manner.

With the event model 310 of the present disclosure, in the case where the second-type interaction event 220 may not be obtained in time due to privacy policies, etc., the prediction 320 of the second-type interaction event 220 may be obtained. In this way, the content provision platform may determine whether continuing to perform the current provision action 330 may meet the provision target 122 in a more real-time and accurate manner. Further, when it is determined that the current provision action 330 may not meet the provision target 122, the provision action 330 may be adjusted to guide the content provision operation to run in a direction that is more in line with the provision target 122.

Figure 4:
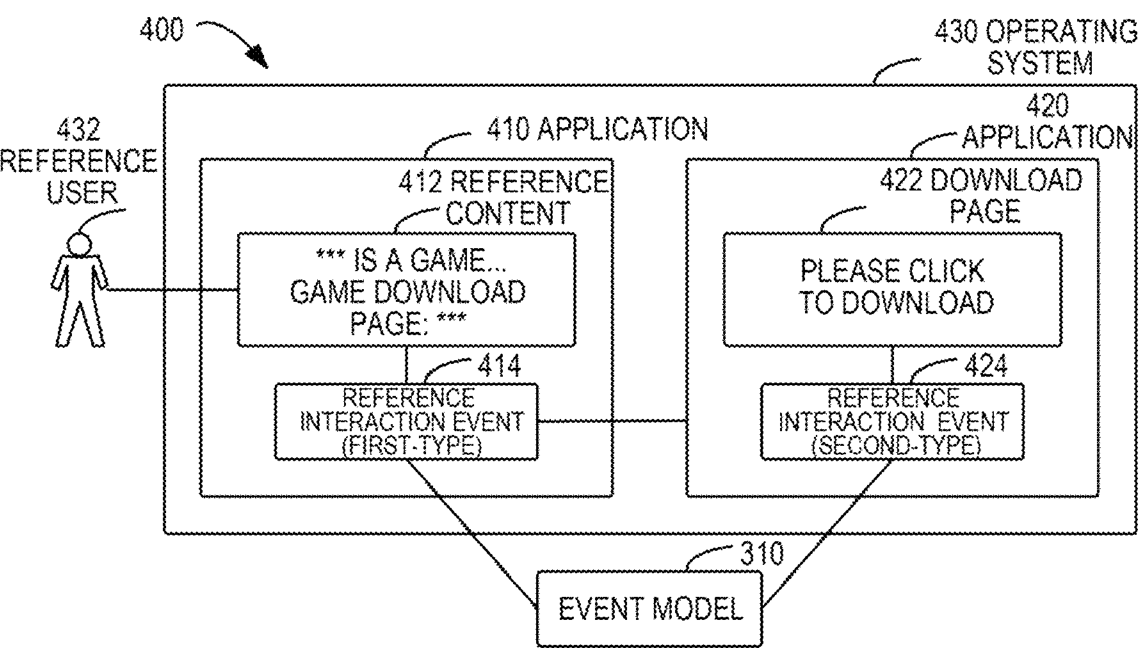
FIG. 4 shows a block diagram of a process of generating an event model according to some embodiments of the present disclosure.

More details regarding the generation of the event model 310 are described below with reference to FIG. 4, which illustrates a block diagram 400 of a process of generating the event model 310 according to some embodiments of the present disclosure. As shown in FIG. 4, the event model 310 may be trained with historical data. It will be appreciated that in some operating systems, such as iPhone operation system (iOS) used in Apple phone, the privacy policy may result in a delay in detecting the user's download event, etc. However, in some operating systems (for example, the Android operating system), various types of download events may be obtained in real time and accurately. In this case, historical events collected under the Android operating system may be used as training data to generate the event model 310.

According to an example implementation of the present disclosure, the application in the model training stage and the application in the model usage stage may be different versions of applications developed for different operating systems, respectively. For example, the application 130 may be developed based on the iOS operating system, and in this case, the user 260 may be the user of the application of the iOS version. The application 410 may be developed based on the Android operating system, and in this case, the reference user 432 may be a user of the application of the Android version. With the example implementation of the present disclosure, the functions of different operating systems may be fully utilized to determine whether the current way of providing the content 140 may achieve the provision target 122 of the content publisher while following privacy protection policies.

In FIG. 4, the application 410 may be run in the Android-based operating system 430, and the content 140 may be provided in the application 410. The content 140 may be presented to a plurality of users (for example, a reference user 432), and the first-type interaction event 414 performed by the reference user 432 for the content 140 may be detected. In order to facilitate distinguishing between the interaction events in the model training stage and the interaction events in the model usage stage, the interaction events involved in the model training stage may be referred to as reference interaction events.

According to an example implementation of the present disclosure, training data may be collected in the Android operating system. A first-type reference interaction event 414 between a reference user 432 of the application 410 and a reference content 412 provided in the application 410 may be obtained. For example, interactions such as browsing and commenting of the reference user 432 on the reference content 412 may be detected. Further, a second-type reference interaction event 424 performed by the reference user 432 and associated with the reference content 412 may be obtained.

According to an example implementation of the present disclosure, the second-type reference interaction event 424 may be obtained by a service provider specified in the reference content 412 after the first-type reference interaction event 414 is obtained. In the environment of the Android operating system, the download data of the reference user may be permissibly obtained from the Android application market, thereby obtaining the second-type reference interaction event 424.

Specifically, the detection capability provided by the Android operating system may be used to detect that the reference user 432 opens the application 420 (for example, the Android application market). If it is determined that the download page 422 is clicked by the reference user 432, and the download operation is performed, it may be determined that the second-type reference interaction event 424 occurs. The reference content 414 may be provided to a plurality of reference users using the Android operating system, and the first-type reference interaction event 414 and the second-type reference interaction event 424 associated with the content publisher may be collected.

Further, the event model 310 may be generated based on the first-type reference interaction event 414 and the second-type reference interaction event 424. Specifically, the event model 310 may be generated in a variety of ways that are currently known and/or will be developed in the future. For example, an encoder technology may be used to extract features of the first-type reference interaction event 414. For example, an embedding of the first-type reference interaction event 414 may be represented by a multi-dimensional vector, and the second-type reference interaction event 424 may be represented by a Boolean value. A value 0 may be used to represent that no download event occurs, and a value 1 may be used to represent that a download event occurs.

Then, the event model 310 with the initial parameter values may be obtained, and the event model 310 may determine, based on the input first-type reference interaction event 414, whether the prediction of the second-type reference interaction event 424 occurs. The loss function may be determined based on the difference between the prediction and the second-type reference interaction event 424 in the training data collected in real life. Further, with a large amount of training data collected, the event model 310 may be continuously optimized in an iterative manner in a direction that minimizes the loss function, thereby obtaining the trained event model 310.

According to an example implementation of the present disclosure, the reference content 412 in the training stage and the content 140 in the application stage may be the same. In this way, by using the training data associated with the same content to generate the event model 310, the accuracy of the event model 310 may be improved. Alternatively, and/or additionally, the reference content 412 and the content 140 may be different. In this way, in the case where it is difficult to obtain the training data related to the content 140, the more easily obtainable training data may be used to generate the event model 310. According to an example implementation of the present disclosure, the reference content 412 and the content 140 may have the same type. Assuming that the content 140 is a game recommendation advertisement, the training data related to the recommendation of another game may be used to generate the event model 310. In this way, the event model 310 may be improved in the case where it is difficult to obtain more matching training data.

Figure 5:
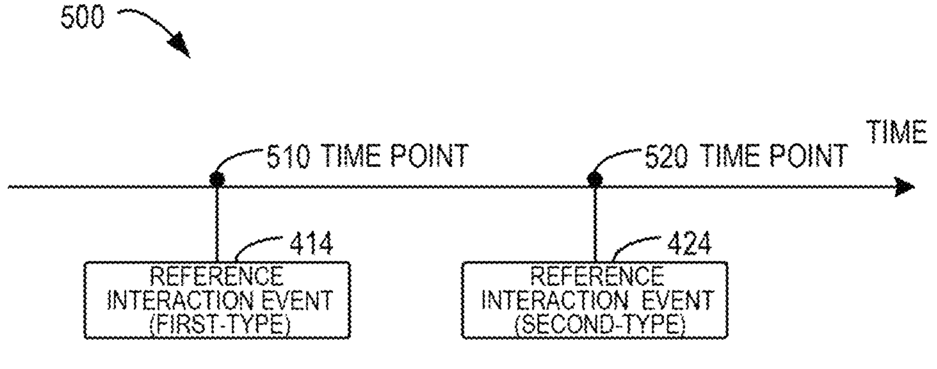
FIG. 5 shows a block diagram of a process of obtaining training data for an event model according to some embodiments of the present disclosure.

FIG. 5 shows a block diagram 500 of a process of obtaining training data for an event model 310 according to some embodiments of the present disclosure. As shown in FIG. 5, it is assumed that the first-type reference interaction event 414 of the reference user 432 is detected at a time point 510. In this case, the reference user 432 may be navigated to the Android application market, and the reference user 432 may download immediately, may download after a period of time thereafter, or may not perform the download. The reference interaction event 424 detected by the Android operating system at a time point 520 may be received, and a message may be returned after the event is determined to indicate that the reference user 432 has performed the download. Alternatively, and/or additionally, the message may further indicate the user who performs the download and the specific time, and so on.

In this way, real and accurate training data may be collected based on the Android operating system. The event model 310 generated based on the training data may accurately describe the association relationship between two types of interaction events. After the event model 310 has been generated, the model may be used to determine, in a more accurate and efficient way, whether a second-type interaction event 220 such as downloading for the content 140 has occurred in the application 130 running in the operating system with strict privacy policies.

Figure 6:
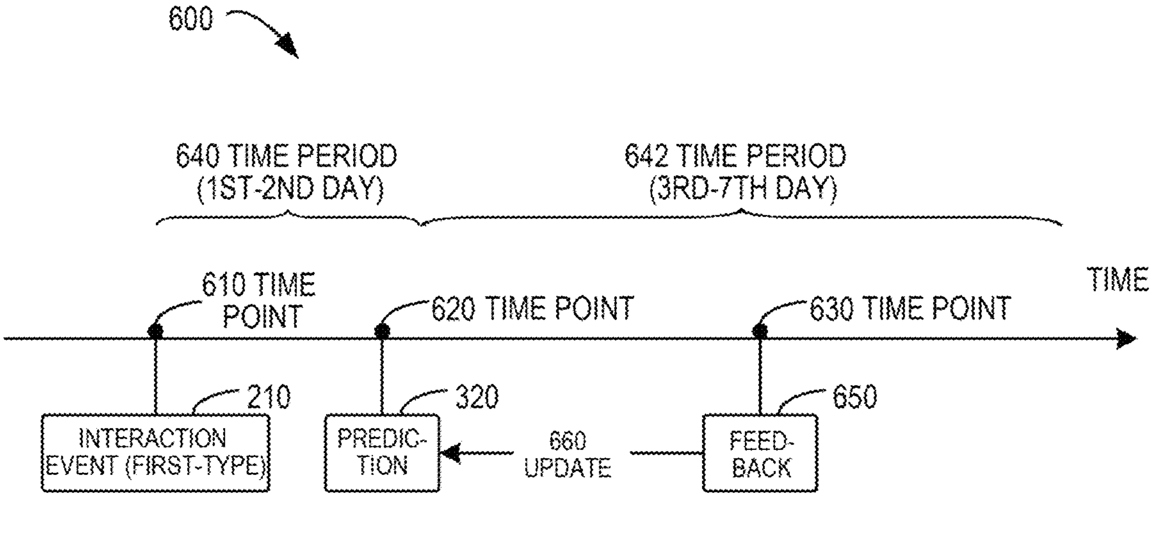
FIG. 6 shows a block diagram of a process of updating a prediction of a second-type interaction event based on non-real-time feedback according to some embodiments of the present disclosure.

The specific process of generating the event model 310 has been described above. In the following, a specific process of using the event model 310 to determine whether the user 260 performs the download action will be described with reference to FIG. 6. FIG. 6 shows a block diagram 600 of a process of updating the prediction 320 of the second-type interaction event based on non-real-time feedback according to some embodiments of the present disclosure. As shown in FIG. 6, the first-type interaction event 210 occurs at a time point 610, and the prediction 320 may be obtained at a time point 620 within a first time period (for example, a time period 640) after the time point 610.

According to an example implementation of the present disclosure, since the user 260 may perform a plurality of first-type interaction events, the event model 310 may be invoked to generate a corresponding prediction 320 every time one interaction event is detected. For example, the event model 310 may be invoked after it is detected that the user 260 clicks on a download link in the content 140 and leaves the application 130. In this case, the event model 310 may return "0" to indicate that the user 260 has not performed the download. The interaction events between the user 260 and the content 140 may be continuously detected. For example, it may be detected that the user 260 follows the publisher of the content 140 and publishes a comment "this game is very good" for the content 140 within a subsequent period of time, and in this case, the embedding of the first-type interaction event 210 may change. Then, the event model 310 may return "1" to indicate that the user 260 has downloaded the game.

It will be appreciated that although whether the game is downloaded is represented by 0 or 1 above, alternatively and/or additionally, the event model 310 may predict a probability that the download event occurs. For example, a value 0 to 1 may be used to represent the download probability. As time goes by, more interaction events may occur, and the prediction 320 may be continuously updated in this case. In this way, the prediction 320 may be continuously updated based on new interaction events of the user 260, thereby improving the accuracy of the prediction 320.

It will be appreciated that the Apple application store on the iOS platform usually may not inform the download event in time. In other words, the notification of the download event may be delayed. In this case, the event model 310 described above may be used to determine whether the user 260 performs the download operation within a short period of time (for example, 1 to 2 days or other time periods) after the content 140 is provided. In this way, the event model 310 may ensure that whether the user 260 has downloaded the game may be determined in a more timely and accurate manner.

According to an example implementation of the present disclosure, within a second time period (for example, a time period 642 in FIG. 6 or other time period) after the first time period, the feedback associated with the second-type interaction event 220 may be obtained with a service provider specified in the content 140, and the prediction may be updated based on the feedback. Generally speaking, the Apple application store may feedback the user's download event after a certain time delay (for example, the third day and/or other time periods). As shown in FIG. 6, the feedback 650 from the Apple application store may be received at a time point 630, so as to update 660 the prediction 320 output by the event model 310.

It will be appreciated that the feedback 650 does not indicate which user downloaded the game at which time point, but only feeds back summary information about the download. For example, the feedback 650 may indicate the number of download events in the past few days, etc. Assuming that the number of downloads is extremely low and the prediction 320 is "downloaded", the prediction 320 may be updated accordingly to "not downloaded". It will be appreciated that only a simplified example of updating the prediction 320 is shown above. Alternatively, and/or additionally, the prediction 320 may be updated in other ways based on the specific content of the feedback 650.

According to an example implementation of the present disclosure, the technical solutions described above may be continuously performed over time. In this way, it may be ensured that corresponding methods are adopted to determine whether the game download event has occurred within a short period (for example, a time period of 1-2 days) and a long period (for example, 3-7 days) after the content 140 is provided.

In the context of the present disclosure, the purpose of determining the game download event is to adjust the provision action 330 for providing the content 140 in the application 130. Therefore, it may be determined, based on the determined prediction 320, whether the current download status of the game is in line with the provision target 122 and the resource allocation 124 associated with the content 140. Here, the provision target 122 may represent a target of second-type interaction events obtained by provision of the content 140 in the application 130, and the resource allocation 124 may represent resources allocated to enable the content provided in the application to meet the provision target. Specifically, an event metric of the second-type interaction event generated by provision of the content 140 in the application 130 and a resource metric of the resource consumed in provision of the content 140 in the application 130 may be determined based on the prediction 320.

Figure 7:
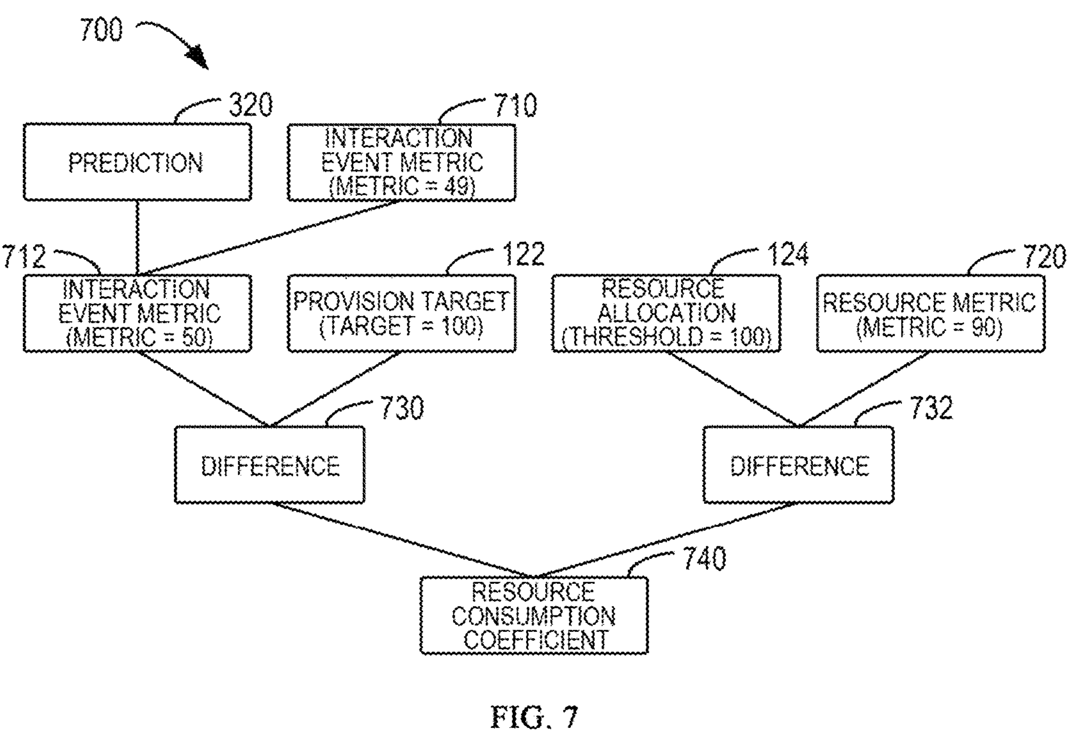
FIG. 7 shows a block diagram of a process of adjusting a resource consumption coefficient during provision of content in an application according to some embodiments of the present disclosure.

Specifically, FIG. 7 shows a block diagram 700 of a process of adjusting a resource consumption coefficient during provision of content in an application according to some embodiments of the present disclosure. In FIG. 7, the provision target 122 may represent the expected number of game downloads (for example, 100 downloads), and the resource allocation 124 represents that 100 resource units in the content provision platform 110 may be used. Assuming that the prediction 320 represents that the user 260 has downloaded the game, the previous interaction event metric 710 may be summed with the current interaction event to determine the current interaction event metric 712 (49+1=50). Further, the interaction event metric 712 may be compared with the provision target 122, and the resource metric 720 may be compared with the resource allocation 14, and then the provision action 330 may be adjusted. Here, the resource metric 720 may represent the number of resource units that have been consumed in order to provide the content 140.

According to an example implementation of the present disclosure, the difference between the event metric and the provision target and the difference between the resource metric and the resource allocation may be determined respectively. Then, the resource consumption coefficient may be adjusted based on the two differences. As shown in FIG. 7, the difference 730 between the interaction event metric 712 and the provision target 122 is large (100−50=50), and the difference 732 between the resource allocation 124 and the resource metric 720 is small (100−90=10). In this case, it may be determined that if the current provision action continues to be run, the 10 resource units of the content publisher will not be sufficient to cover the resource overhead to achieve 50 downloads. In this case, the resource consumption coefficient 740 in the action 330 may be adjusted (for example, reduced). Here, the resource consumption coefficient is used to control the resources consumed in providing the content in the application.

According to an example implementation of the present disclosure, assuming that the previous resource consumption coefficient 740 is 1, in this case, the resource consumption coefficient 740 may be reduced accordingly (for example, the coefficient may be set to be less than 1) based on the ratio of the number of downloads that have been obtained to the provision target 122 and the ratio of resources that have been used to the resource allocation 124. In other words, in this case, the content provision platform 110 may subsidize the content publisher, and the number of downloads may be made to match the provision target 122 as much as possible in a way that is transparent to the content publisher.

In another example, assuming that the number of downloads obtained based on the prediction is 90 and the resource metric that has been consumed is 50, the resource consumption coefficient 740 may be increased (for example, the coefficient may be set to be greater than 1). In yet another example, assuming that the number of downloads obtained based on the prediction is 90 and the resource metric that has been consumed is also 90, the resource consumption coefficient 740 may be maintained (for example, the coefficient may be set to be equal to 1). Further, the provision action may be adjusted based on the updated resource consumption coefficient. In other words, in this case, the resource units will be deducted from the account of the content publisher according to the adjusted resource consumption coefficient 740.

It will be appreciated that although only a simple example of adjusting the resource consumption coefficient 740 based on the comparison is shown above. Alternatively, and/or additionally, the resource consumption coefficient 740 may be adjusted accordingly based on control feedback algorithms that are currently developed and/or will be developed in the future. For example, after long-period data of 7 days is acquired, the resource consumption coefficient 740 may be determined by using a Proportional-Integral-Differential (PID) algorithm. The coefficient may be adjusted in real time, and if it is found that the long-period resource consumption of 7 days exceeds the resource allocation 124 of the content publisher, the coefficient may be reduced, thereby reducing the resource consumption cost of the content publisher. Otherwise, the coefficient may be appropriately increased to make the actual number of downloads obtained by the content publisher consistent with the provision target 122.

According to an example implementation of the present disclosure, in the case where content is provided in an application in an operating system with strict privacy policy restrictions, an interaction event that was originally undetectable between the user and the content may be determined in a more real-time and accurate manner. Further, an action of providing the content in the application may be adjusted in time based on the prediction, thereby making the user interaction events generated by the content provision consistent with the expectations of the content publisher.

Example Process

Figure 8:
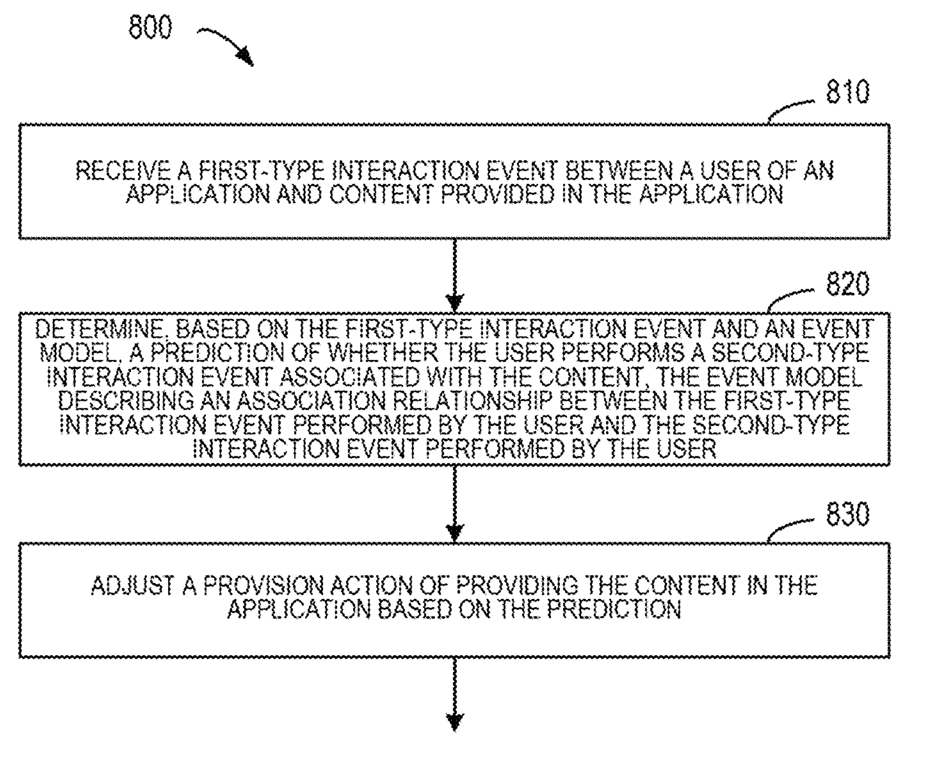
FIG. 8 shows a flowchart of a method for providing content in an application according to some embodiments of the present disclosure.

FIG. 8 shows a flowchart of a method 800 for providing content in an application according to some implementations of the present disclosure. At block 810, a first-type interaction event between a user of an application and content provided in the application is received. At block 820, based on the first-type interaction event and an event model, a prediction of whether the user performs a second-type interaction event associated with the content is determined, the event model describing an association relationship between the first-type interaction event performed by the user and the second-type interaction event performed by the user. At block 830, a provision action of providing the content in the application is adjusted based on the prediction.

According to an example implementation of the present disclosure, the method 800 further includes: obtaining a first-type reference interaction event between a reference user of the application and reference content provided in the application; obtaining a second-type reference interaction event performed by the reference user and associated with the reference content; and generating the event model based on the first-type reference interaction event and the second-type reference interaction event.

According to an example implementation of the present disclosure, the content is content provided in a first version of the application, and the reference content is content provided in a second version of the application, the first version of the application and the second version of the application being run in a first operating system and a second operating system, respectively.

According to an example implementation of the present disclosure, obtaining the second-type reference interaction event includes: obtaining, by a service provider specified in the reference content, the second-type reference interaction event after obtaining the first-type reference interaction event.

According to an example implementation of the present disclosure, determining the prediction includes obtaining the prediction within a first time period after the first-type interaction event occurs, and the method further includes: obtaining, within a second time period after the first time period, feedback associated with the second-type interaction event by a service provider specified in the content; and updating the prediction based on the feedback.

According to an example implementation of the present disclosure, adjusting the provision action based on the prediction includes: obtaining a provision target and a resource allocation associated with the content, the provision target representing a target of a second-type interaction event obtained by provision of the content in the application, and the resource allocation representing a resource allocated to enable the content provided in the application to meet the provision target; determining, based on the prediction, an interaction event metric of the second-type interaction event generated by provision of the content in the application and a resource metric of the resource consumed in provision of the content in the application; and adjusting the provision action based on a comparison between the interaction event metric, the provision target, the resource metric, and the resource allocation.

According to an example implementation of the present disclosure, adjusting the provision action based on the comparison includes updating, based on the comparison, a resource consumption coefficient associated with the provision action, the resource consumption coefficient being configured to control a resource consumed in the provision action; and adjusting the provision action based on the updated resource consumption coefficient.

According to an example implementation of the present disclosure, updating the resource consumption coefficient includes at least one of: determining a first difference between the event metric and the provision target and a second difference between the resource metric and the resource allocation, respectively; and adjusting the resource consumption coefficient based on the first difference and the second difference.

According to an example implementation of the present disclosure, the first-type interaction event includes at least one of: browsing of the user for the content; interaction of the user with a content item in the content; navigation of the user to a further application outside the application with the content item in the content; a comment of the user for the content in the application; publication of the user of a creation associated with the content in the application; following of the user for a publisher of the content; browsing of the user for other content published by the publisher of the content; and a comment of the user for other content published by a publisher of the content.

According to an example implementation of the present disclosure, the second-type interaction event is an interaction event in a further application outside the application and includes at least one of: the user downloading, subscribing to, paying for, or registering for the content.

Example Apparatus and Device

Figure 9:
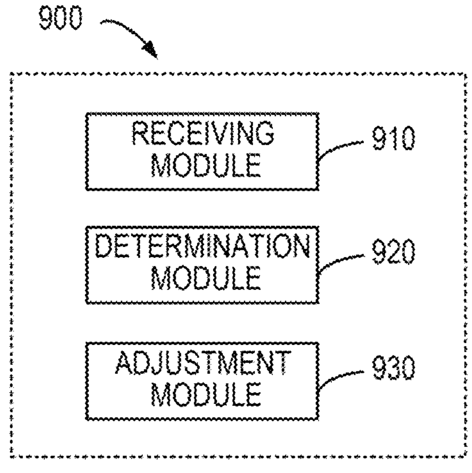
FIG. 9 shows a block diagram of an apparatus for providing content in an application according to some implementations of the present disclosure.

FIG. 9 shows a block diagram of an apparatus 900 for providing content in an application according to some implementations of the present disclosure. The apparatus 900 includes: a receiving module 910 configured to receive a first-type interaction event between a user of an application and content provided in the application; a determination module 920 configured to determine, based on the first-type interaction event and an event model, a prediction of whether the user performs a second-type interaction event associated with the content, the event model describing an association relationship between the first-type interaction event performed by the user and the second-type interaction event performed by the user; and an adjustment module 930 configured to adjust a provision action of providing the content in the application based on the prediction.

According to an example implementation of the present disclosure, the apparatus 900 further includes: a first obtaining module configured to obtain a first-type reference interaction event between a reference user of the application and reference content provided in the application; a second obtaining module configured to obtain a second-type reference interaction event performed by the reference user and associated with the reference content; and a generation module configured to generate the event model based on the first-type reference interaction event and the second-type reference interaction event.

According to an example implementation of the present disclosure, the content is content provided in a first version of the application, and the reference content is content provided in a second version of the application, the first version of the application and the second version of the application being run in a first operating system and a second operating system, respectively.

According to an example implementation of the present disclosure, the second obtaining module includes: an event obtaining module configured to obtain the second-type reference interaction event by a service provider specified in the reference content after obtaining the first-type reference interaction event.

According to an example implementation of the present disclosure, the determination module 920 includes: a prediction determination module configured to obtain the prediction within a first time period after the first-type interaction event occurs.

According to an example implementation of the present disclosure, the apparatus 900 further includes: a feedback obtaining module configured to obtain, within a second time period after the first time period, feedback associated with the second-type interaction event by a service provider specified in the content; and an updating module configured to update the prediction based on the feedback.

According to an example implementation of the present disclosure, the adjustment module 930 includes: a target obtaining module configured to obtain a provision target and a resource allocation associated with the content, the provision target representing a target of a second-type interaction event obtained by provision of the content in the application, and the resource allocation representing a resource allocated to enable the content provided in the application to meet the provision target; a metric determination module configured to determine, based on the prediction, an interaction event metric of the second-type interaction event generated by provision of the content in the application and a resource metric of the resource consumed in provision of the content in the application; and a comparison-based adjustment module configured to adjust the provision action based on a comparison between the interaction event metric, the provision target, the resource metric, and the resource allocation.

According to an example implementation of the present disclosure, the comparison-based adjustment module includes: a coefficient update module configured to update, based on the comparison, a resource consumption coefficient associated with the provision action, the resource consumption coefficient being configured to control a resource consumed in the provision action; and an action adjustment module configured to adjust the provision action based on the updated resource consumption coefficient.

According to an example implementation of the present disclosure, the coefficient update module includes at least one of: a difference determination module configured to determine a first difference between the event metric and the provision target and a second difference between the resource metric and the resource allocation, respectively; and a coefficient adjustment module configured to adjust the resource consumption coefficient based on the first difference and the second difference.

According to an example implementation of the present disclosure, the first-type interaction event includes at least one of: browsing of the user for the content; interaction of the user with a content item in the content; navigation of the user to a further application outside the application with the content item in the content; a comment of the user for the content in the application; publication of the user of a creation associated with the content in the application; following of the user for a publisher of the content; browsing of the user for other content published by the publisher of the content; and a comment of the user for other content published by a publisher of the content.

According to an example implementation of the present disclosure, the second-type interaction event is an interaction event in a further application outside the application and includes at least one of: the user downloading, subscribing to, paying for, or registering for the content.

Figure 10:
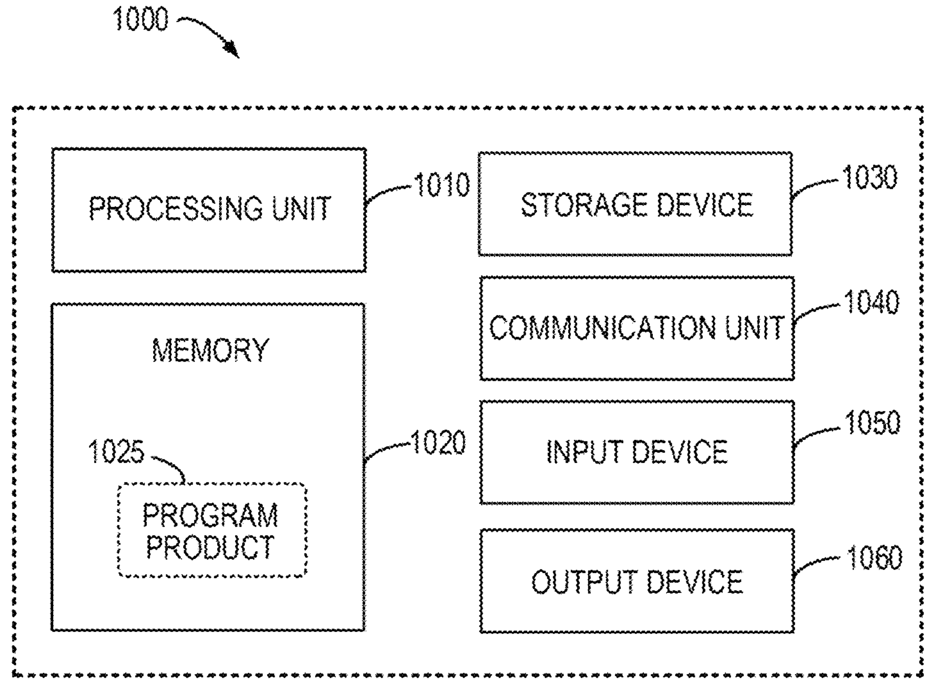
FIG. 10 shows a block diagram of an electronic device in which one or more embodiments of the present disclosure may be implemented.

FIG. 10 shows a block diagram of an electronic device 1000 in which one or more embodiments of the present disclosure may be implemented. It should be understood that the electronic device 1000 shown in FIG. 10 is only illustrative, and should not constitute any limitation to the function and scope of the embodiments described herein. The electronic device 1000 shown in FIG. 10 may be used to implement the content provision platform 110 in FIG. 1.

As shown in FIG. 10, the electronic device 1000 is in the form of a general-purpose computing device. The components of the electronic device 1000 may include, but are not limited to, one or more processors or processing units 1010, a memory 1020, a storage device 1030, one or more communication units 1040, one or more input devices 1050, and one or more output devices 1060. The processing unit 1010 may be an actual or virtual processor and may perform various processes according to programs stored in the memory 1020. In a multi-processor system, a plurality of processing units execute computer-executable instructions in parallel to increase the parallel processing capability of the electronic device 1000.

The electronic device 1000 generally includes a plurality of computer storage media. Such media may be any available media accessible by the electronic device 1000, including but not limited to volatile and non-volatile media, and detachable and non-detachable media. The memory 1020 may be a volatile memory (for example, a register, a cache, a random access memory (RAM)), a non-volatile memory (for example, a read-only memory (ROM), an electrically erasable programmable read-only memory (EEPROM), a flash), or any combination thereof. The storage device 1030 may be a detachable or non-detachable medium, and may include a machine-readable medium, such as a flash drive, a disk, or any other medium that may be used to store information and/or data (for example, training data for training) and may be accessed within the electronic device 1000.

The electronic device 1000 may further include additional detachable/non-detachable, volatile/non-volatile storage media. Although not shown in FIG. 10, a disk drive for reading from or writing to a detachable, non-volatile disk (for example, a "floppy disk") and an optical disk drive for reading from or writing to a detachable, non-volatile optical disk may be provided. In these cases, each drive may be connected to a bus (not shown) by one or more data media interfaces. The memory 1020 may include a computer program product 1025 having one or more program modules configured to perform various methods or actions of various embodiments of the present disclosure.

The communication unit 1040 enables communication with other electronic devices through a communication medium. Additionally, the functions of the components of the electronic device 1000 may be implemented in a single computing cluster or a plurality of computing machines that may communicate through communication connections. Therefore, the electronic device 1000 may operate in a networked environment using a logical connection with one or more other servers, network personal computers (PCs), or another network node.

The input device 1050 may be one or more input devices, such as a mouse, a keyboard, a trackball, etc. The output device 1060 may be one or more output devices, such as a display, a speaker, a printer, etc. The electronic device 1000 may also communicate with one or more external devices (not shown) such as storage devices, display devices, etc. through the communication unit 1040 as required, communicate with one or more devices that enable the user to interact with the electronic device 1000, or communicate with any device (for example, a network card, a modem, etc.) that enables the electronic device 1000 to communicate with one or more other electronic devices. Such communication may be performed via an input/output (I/O) interface (not shown).

According to an example implementation of the present disclosure, a computer-readable storage medium is provided, which has computer-executable instructions stored thereon, where the computer-executable instructions are executed by a processor to implement the method described above. According to an example implementation of the present disclosure, a computer program product is further provided, which is tangibly stored on a non-transitory computer-readable medium and includes computer-executable instructions, and the computer-executable instructions are executed by a processor to implement the method described above.

Various aspects of the present disclosure are described herein with reference to the flowcharts and/or block diagrams of the method, the apparatus, the device, and the computer program product implemented according to the present disclosure. It should be understood that each block in the flowchart and/or block diagram and the combination of the blocks in the flowchart and/or block diagram may be implemented by computer-readable program instructions.

These computer-readable program instructions may be provided to the processing unit of a general-purpose computer, a special-purpose computer, or other programmable data processing apparatus, thereby producing a machine that, when the instructions are executed by the processing unit of the computer or other programmable data processing apparatus, produces a device that implements the functions/actions specified in one or more of the blocks in the flowchart and/or block diagram. These computer-readable program instructions may also be stored in a computer-readable storage medium. These instructions cause the computer, the programmable data processing apparatus, and/or other devices to work in a specific way, and therefore, the computer-readable medium having the instructions stored thereon includes an article of manufacture, which includes instructions for implementing various aspects of the functions/actions specified in one or more of the blocks in the flowchart and/or block diagram.

The computer-readable program instructions may be loaded onto a computer, other programmable data processing apparatuses, or other devices, so that a series of operation steps are executed on the computer, other programmable data processing apparatuses, or other devices to generate a computer-implemented process, so that the instructions executed on the computer, other programmable data processing apparatuses, or other devices implement the functions/acts specified in one or more blocks in the flowcharts and/or block diagrams.

The flowcharts and block diagrams in the drawings show the architecture, functionality, and operation of possible implementations of the system, method, and computer program product according to a plurality of implementations of the present disclosure. In this regard, each block in the flowcharts or block diagrams may represent a module, a program segment, or a portion of an instruction, and the module, the program segment, or the portion of the instruction includes one or more executable instructions for implementing a specified logical function. In some alternative implementations, the functions noted in the blocks may also occur out of the order noted in the drawings. For example, two consecutive blocks may, in fact, be executed substantially concurrently, or the blocks may sometimes be executed in the reverse order, depending on the functionality involved. It should also be noted that each block of the block diagrams and/or flowcharts and combinations of blocks in the block diagrams and/or flowcharts may be implemented by a dedicated hardware-based system that performs the specified functions or acts or may be implemented by a combination of dedicated hardware and computer instructions.

Various implementations of the present disclosure have been described above. The above descriptions are illustrative and not exhaustive, and are not limited to the disclosed implementations. Many modifications and variations are obvious to those of ordinary skill in the art without departing from the scope and spirit of the described implementations. The selection of terms used in this document is intended to best explain the principles of the implementations, the practical application, or the improvement of the technology in the market, or to enable other ordinary skilled in the art to understand the implementations disclosed in this document.

What is claimed is:

1. A method for providing content in an application, comprising:

receiving a first-type interaction event between a user of the application and content provided in the application, wherein the user is associated with a second operating system environment;

determining, based on the first-type interaction event and an event model, an initial prediction of whether the user performs a second-type interaction event associated with the content, the event model describing an association relationship between the first-type interaction event performed by the user and the second-type interaction event performed by the user, wherein the event model is trained based on a first reference interaction data set from a first operating system that provides conversion feedback within a first time period;

receiving conversion feedback data from a server associated with the second operating system environment at a time subsequent to the determining of the initial prediction, the second operating system environment providing conversion feedback within a second time period greater than the first time period;

updating the initial prediction to obtain a corrected prediction by incorporating the received conversion feedback data; and adjusting a provision action of providing the content in the application based on the corrected prediction.

2. The method of claim 1, further comprising:

obtaining a first-type reference interaction event between a reference user of the application and reference content provided in the application;

obtaining a second-type reference interaction event performed by the reference user and associated with the reference content; and generating the event model based on the first-type reference interaction event and the second-type reference interaction event.

3. The method of claim 2, wherein the content is the content provided in a first version of the application, and the reference content is the content provided in a second version of the application, and the first version of the application and the second version of the application run in the first operating system and the second operating system environment, respectively.

4. The method of claim 2, wherein obtaining the second-type reference interaction event comprises: obtaining, by a service provider specified in the reference content, the second-type reference interaction event after obtaining the first-type reference interaction event.

5. The method of claim 1, wherein determining the initial prediction comprises: obtaining the initial prediction within the first time period after the first-type interaction event occurs, and the method further comprises:

obtaining, within the second time period after the first time period, by a service provider specified in the content, the conversion feedback data associated with the second-type interaction event; and updating the initial prediction based on the conversion feedback data.

6. The method of claim 1, wherein adjusting the provision action based on the corrected prediction comprises:

obtaining a provision target and a resource allocation associated with the content, the provision target representing a target of the second-type interaction event obtained by provision of the content in the application, and the resource allocation representing a resource allocated to enable the content provided in the application to meet the provision target;

determining, based on the corrected prediction, an interaction event metric of the second-type interaction event generated by the provision of the content in the application and a resource metric of the resource consumed in the provision of the content in the application; and adjusting the provision action based on a comparison between the interaction event metric, the provision target, the resource metric, and the resource allocation.

7. The method of claim 6, wherein adjusting the provision action based on the comparison comprises:

updating, based on the comparison, a resource consumption coefficient associated with the provision action, the resource consumption coefficient configured to control a resource consumed in the provision action; and adjusting the provision action based on the updated resource consumption coefficient.

8. The method of claim 7, wherein updating the resource consumption coefficient comprises at least one of:

determining a first difference between the interaction event metric and the provision target and a second difference between the resource metric and the resource allocation, respectively; or adjusting the resource consumption coefficient based on the first difference and the second difference.

9. The method of claim 1, wherein the first-type interaction event comprises at least one of:

browsing of the user for the content;

interaction of the user with a content item in the content;

navigation of the user to a further application outside the application with the content item in the content;

a comment of the user for the content in the application;

publication of the user of a creation associated with the content in the application;

following of the user for a publisher of the content;

browsing of the user for other content published by a publisher of the content; or a comment of the user for other content published by a publisher of the content.

10. The method of claim 1, wherein the second-type interaction event is an interaction event in a further application outside the application and comprises at least one of: the user downloading, subscribing to, paying for, or registering for the content.

11. An electronic device, comprising:

at least one processing unit; and at least one memory coupled to the at least one processing unit and storing instructions executable by the at least one processing unit, the instructions, when executed by the at least one processing unit, causing the electronic device to perform operations comprising:

receiving a first-type interaction event between a user of an application and content provided in the application, wherein the user is associated with a second operating system environment;

determining, based on the first-type interaction event and an event model, an initial prediction of whether the user performs a second-type interaction event associated with the content, the event model describing an association relationship between the first-type interaction event performed by the user and the second-type interaction event performed by the user, wherein the event model is trained based on a first reference interaction data set from a first operating system that provides conversion feedback within a first time period;

receiving conversion feedback data from a server associated with the second operating system environment at a time subsequent to the determining of the initial prediction, the second operating system environment providing conversion feedback within a second time period greater than the first time period;

updating the initial prediction to obtain a corrected prediction by incorporating the received conversion feedback data; and adjusting a provision action of providing the content in the application based on the corrected prediction.

12. The electronic device of claim 11, wherein the instructions, when executed by the at least one processing unit, causing the electronic device to perform operations further comprising:

obtaining a first-type reference interaction event between a reference user of the application and reference content provided in the application;

obtaining a second-type reference interaction event performed by the reference user and associated with the reference content; and generating the event model based on the first-type reference interaction event and the second-type reference interaction event.

13. The electronic device of claim 12, wherein the content is the content provided in a first version of the application, and the reference content is the content provided in a second version of the application, and the first version of the application and the second version of the application run in the first operating system and the second operating system environment, respectively.

14. The electronic device of claim 12, wherein obtaining the second-type reference interaction event comprises: obtaining, by a service provider specified in the reference content, the second-type reference interaction event after obtaining the first-type reference interaction event.

15. The electronic device of claim 11, wherein determining the initial prediction comprises: obtaining the initial prediction within the first time period after the first-type interaction event occurs, and the operations further comprise:

obtaining, within the second time period after the first time period, by a service provider specified in the content, the conversion feedback data associated with the second-type interaction event; and updating the initial prediction based on the conversion feedback data.

16. The electronic device of claim 11, wherein adjusting the provision action based on the corrected prediction comprises:

obtaining a provision target and a resource allocation associated with the content, the provision target representing a target of the second-type interaction event obtained by provision of the content in the application, and the resource allocation representing a resource allocated to enable the content provided in the application to meet the provision target;

determining, based on the corrected prediction, an interaction event metric of the second-type interaction event generated by the provision of the content in the application and a resource metric of the resource consumed in the provision of the content in the application; and adjusting the provision action based on a comparison between the interaction event metric, the provision target, the resource metric, and the resource allocation.

17. The electronic device of claim 16, wherein adjusting the provision action based on the comparison comprises:

updating, based on the comparison, a resource consumption coefficient associated with the provision action, the resource consumption coefficient configured to control a resource consumed in the provision action; and adjusting the provision action based on the updated resource consumption coefficient.

18. The electronic device of claim 17, wherein updating the resource consumption coefficient comprises at least one of:

determining a first difference between the interaction event metric and the provision target and a second difference between the resource metric and the resource allocation, respectively; or adjusting the resource consumption coefficient based on the first difference and the second difference.

19. The electronic device of claim 11, wherein the first-type interaction event comprises at least one of:

browsing of the user for the content;

interaction of the user with a content item in the content;

navigation of the user to a further application outside the application with the content item in the content;

a comment of the user for the content in the application;

publication of the user of a creation associated with the content in the application;

following of the user for a publisher of the content;

browsing of the user for other content published by a publisher of the content; or a comment of the user for other content published by a publisher of the content.

20. A non-transitory computer-readable storage medium storing a computer program that, when executed by a processor, performs operations comprising:

receiving a first-type interaction event between a user of an application and content provided in the application, wherein the user is associated with a second operating system environment;

determining, based on the first-type interaction event and an event model, an initial prediction of whether the user performs a second-type interaction event associated with the content, the event model describing an association relationship between the first-type interaction event performed by the user and the second-type interaction event performed by the user, wherein the event model is trained based on a first reference interaction data set from a first operating system that provides conversion feedback within a first time period;

receiving conversion feedback data from a server associated with the second operating system environment at a time subsequent to the determining of the initial prediction, the second operating system environment providing conversion feedback within a second time period greater than the first time period;

updating the initial prediction to obtain a corrected prediction by incorporating the received conversion feedback data; and adjusting a provision action of providing the content in the application based on the corrected prediction.

* * * * *